US012792008B2

(12) United States Patent
Schweid et al.

(10) Patent No.: US 12,792,008 B2
(45) Date of Patent: Nov. 10, 2026

(54) MACHINE LEARNING FEATURE FEED RATES FOR 3D PRINTING

(71) Applicant: Genesee Valley Innovations, LLC, Santa Clara, CA (US)

(72) Inventors: Stuart A. Schweid, Pittsford, NY (US); PriyaankaDevi Guggilapu, Durham, NC (US); Benjamin Paulson, Walworth, NY (US); Collin Alexander Ladd, Charlotte, NC (US); Dinesh Krishna Kumar Jayabal, Rochester, NY (US); David A. Mantell, Rochester, NY (US)

(73) Assignee: Genesee Valley Innovations, LLC, Santa Clara, CA (US)

( * ) Notice: Subject to any disclaimer, the term of this patent is extended or adjusted under 35 U.S.C. 154(b) by 731 days.

(21) Appl. No.: 18/168,126

(22) Filed: Feb. 13, 2023

(65) Prior Publication Data

US 2024/0272612 A1 Aug. 15, 2024

(51) Int. Cl.
*G05B 19/4099* (2006.01)
*B22F 10/38* (2021.01)
(Continued)

(52) U.S. Cl.
CPC ........ *G05B 19/4099* (2013.01); *B22F 10/385* (2021.01); *B22F 10/85* (2021.01);
(Continued)

(58) Field of Classification Search
CPC ...... G05B 19/4099; G05B 2219/49023; G05B 2219/33002; G06N 20/00; G06N 20/10;
(Continued)

(56) References Cited

U.S. PATENT DOCUMENTS 9,827,717 B2 11/2017 Huang et al.
2005/0251284 A1* 11/2005 Balic .................. G05B 19/4099 700/182
(Continued)

FOREIGN PATENT DOCUMENTS

EP 3800539 A1 4/2021

OTHER PUBLICATIONS

Extended European Search Report issued Jul. 17, 2024 in corresponding EP Application No. 24153007.0, 7 pages.

*Primary Examiner* — Rami R Okasha
(74) *Attorney, Agent, or Firm* — MH2 Technology Law Group LLP

(57) ABSTRACT

Systems for and methods of providing a feed rate for three-dimensional printing a part are presented. The disclosed techniques include: obtaining computer readable toolpath instructions for the part, where the toolpath instructions specify a nominal feed rate for a toolpath segment and spatial toolpath data of the toolpath segment; providing an input including the spatial toolpath data to a trained machine learning system, where the trained machine learning system has been trained using training data including: training spatial toolpath data, training closed loop gain data, and training feed rate data; obtaining a revised feed rate for the toolpath segment different from the nominal feed rate for the toolpath segment, where the revised feed rate is output from the trained machine learning system; and providing revised computer readable toolpath instructions, where the revised machine learning toolpath instructions include the revised feed rate.

20 Claims, 8 Drawing Sheets

(51) Int. Cl.
*B22F 10/85* (2021.01)
*G06F 113/10* (2020.01)
*G06N 20/00* (2019.01)

(52) U.S. Cl.
CPC ... *G06N 20/00* (2019.01); *G05B 2219/49023* (2013.01); *G06F 2113/10* (2020.01)

(58) Field of Classification Search
CPC ....... G06N 3/09; G06F 30/27; G06F 2113/10; B22F 10/22; B22F 10/80; B22F 10/85; B22F 10/385; B29C 64/386; B29C 64/393; B33Y 10/00; B33Y 50/02
See application file for complete search history.

(56) References Cited

U.S. PATENT DOCUMENTS

| | | | | |
|---|---|---|---|---|
| 2018/0210406 | A1* | 7/2018 | Shimizu | G05B 13/027 |
| 2018/0341248 | A1* | 11/2018 | Mehr | B22F 10/00 |
| 2019/0022725 | A1* | 1/2019 | Bauer | B05B 15/50 |
| 2021/0178697 | A1* | 6/2021 | Nilakantan | G06Q 10/06 |
| 2021/0397142 | A1* | 12/2021 | Lovell | G06N 3/08 |
| 2022/0347930 | A1* | 11/2022 | Paddock | B33Y 50/02 |
| 2022/0414380 | A1 | 12/2022 | Price et al. | |
| 2023/0021335 | A1* | 1/2023 | Picard | B22F 10/25 |
| 2025/0189939 | A1* | 6/2025 | Brion | G05B 13/0265 |

* cited by examiner

300

MACHINE LEARNING FEATURE FEED RATES FOR 3D PRINTING

FIELD

This disclosure relates generally to three-dimensional (3D) printing.

BACKGROUND

In general, 3D printing an object can proceed in layers according to a Cartesian coordinate system oriented such that each layer is parallel to the XY plane, e.g., representing the horizontal surface of the Earth, with additional layers added to extend the object in the Z-axis direction, e.g., representing up and down relative to gravity. Deposition of print material for each layer may be provided according to a toolpath, that is, a defined route of the deposition nozzle. The toolpath may be specified by computer readable toolpath instructions, such as a GCode file. Additional layers may be added to build the object in the Z-axis Z axis direction.

Furthermore, 3D printing may be used to manufacture complex 3D designs that otherwise could not be made using traditional methods such as machining, casting, or injection molding. This ability is made possible through the aforementioned layered printing process. In this approach, complex features, such as re-entrant geometries, hollow features, fine features which the traditional tools cannot machine owing to space constraints or reachability, and the like, are divided among multiple layers and fairly simple 2D layers are printed one above the other until the entire object is completed in this fashion. Despite this straightforward approach, each 3D printing process by virtue of its working principle or construction has its own challenges to address. One such common challenge manifests in the form of overhangs. An overhang is a feature of a 3D printed part that is unsupported by an underlying support structure. A layer-by-layer printing approach can produce one or more undersides of a slope in a part, where each subsequent layer must protrude slightly beyond a preceding layer. As the initially printed material is still in its flowable liquid state prior to solidification, gravity and other factors, such as the angle and slope of the overhang, can result in drooping or sagging, curling, or the prohibition of printing a desired shape altogether.

For large homogenous areas in a layer, the feed rate, that is the rate of print material flow through the print nozzle (e.g., extrusion rate, flow rate, drop rate, etc.) of print material to produce a specified layer thickness can be readily calculated. However, this does not generally hold for features of anisotropic regions, which can include outer perimeters, thin features, and overhangs. This is because the 3D printer system's response at such edge-type regions are functions of flow, temperature, and other variables. The most direct method of calculating the appropriate feed rates is to print the feature type at several different feed rates and have a metric or visual assessment that measures the part quality. This can be laborious and time consuming for multiple part types.

SUMMARY

According to various embodiments, a method of providing a feed rate for three-dimensional printing a part is presented. The method includes: obtaining computer readable toolpath instructions for the part, where the toolpath instructions specify a nominal feed rate for a toolpath segment and spatial toolpath data of the toolpath segment; providing an input including the spatial toolpath data to a trained machine learning system, where the trained machine learning system has been trained using training data including: training spatial toolpath data, training closed loop gain data, and training feed rate data; obtaining a revised feed rate for the toolpath segment different from the nominal feed rate for the toolpath segment, where the revised feed rate is output from the trained machine learning system; and providing revised computer readable toolpath instructions, where the revised machine learning toolpath instructions include the revised feed rate.

Various optional features of the above embodiments include the following. The method may include printing the part using the revised computer readable toolpath instructions. The input may further include a predetermined closed loop gain value. The training data may include data that is specific to the part, and the method may further include training the trained machine learning system using the training data. The toolpath instructions may specify an anisotropic region of the part that includes the toolpath segment. The anisotropic region may include at least one of: an overhang, an outer perimeter, or a thin feature. The spatial toolpath data for the toolpath segment may include at least one of: a distance from an edge of the part, a distance from a corner of the part, or a rounding radius of the toolpath segment. The training data may further include training overhang angle data. The training feed rate data may include an induced feed rate variation. The induced feed rate variation may include a periodic induced feed rate variation along an edge of a feature.

According to various embodiments, a system for providing a feed rate for three-dimensional printing a part is presented. The system includes an electronic processor and a persistent memory storing non-transitory computer readable instructions that, when executed by the electronic processor, configure the electronic processor to perform actions including: obtaining computer readable toolpath instructions for the part, where the toolpath instructions specify a nominal feed rate for a toolpath segment and spatial toolpath data of the toolpath segment; providing an input including the spatial toolpath data to a trained machine learning system, where the trained machine learning system has been trained using training data including: training spatial toolpath data, training closed loop gain data, and training feed rate data; obtaining a revised feed rate for the toolpath segment different from the nominal feed rate for the toolpath segment, where the revised feed rate is output from the trained machine learning system; and providing revised computer readable toolpath instructions, where the revised machine learning toolpath instructions include the revised feed rate.

Various optional features of the above embodiments include the following. The actions may further include printing the part using the revised computer readable toolpath instructions. The input may further include a predetermined closed loop gain value. The training data may include data that is specific to the part, and the actions may further include training the trained machine learning system using the training data. The toolpath instructions may specify an anisotropic region of the part that includes the toolpath segment. The anisotropic region may include at least one of: an overhang, an outer perimeter, or a thin feature. The spatial toolpath data for the toolpath segment may include at least one of: a distance from an edge of the part, a distance from a corner of the part, or a rounding radius of the toolpath segment. The training data may further include training overhang angle data. The training feed rate data may include an induced feed rate variation. The induced feed rate variation may include a periodic induced feed rate variation along an edge of a feature.

Combinations, (including multiple dependent combinations) of the above-described elements and those within the specification have been contemplated by the inventors and may be made, except where otherwise indicated or where contradictory.

BRIEF DESCRIPTION OF THE DRAWINGS

Various features of the examples can be more fully appreciated, as the same become better understood with reference to the following detailed description of the examples when considered in connection with the accompanying figures, in which.

DESCRIPTION OF THE EXAMPLES

Reference will now be made in detail to example implementations, illustrated in the accompanying drawings. Wherever convenient, the same reference numbers will be used throughout the drawings to refer to the same or like parts. In the following description, reference is made to the accompanying drawings that form a part thereof, and in which is shown by way of illustration specific exemplary examples in which the invention may be practiced. These examples are described in sufficient detail to enable those skilled in the art to practice the invention, and it is to be understood that other examples may be utilized and that changes may be made without departing from the scope of the invention. The following description is, therefore, merely exemplary.

In 3D printing there are special feature types that require feed rate settings different from the nominal feed rate settings that are used for large uniform sections of a layer. Most of these features are quickly locally varying in at least one dimension, such as: thin features, overhangs, and outer perimeters. Thin features, for example, may be thinner than the nominal layer thickness in the direction of the Z-axis. It is difficult to determine the appropriate feed rates of these feature types, as they can vary significantly based on feature type. Currently, the feature is printed multiple times (e.g., twenty times) at various feed rates and the feed rate that the optimizes print quality, using either a metric or visual assessment, is chosen.

Various embodiments use the closed loop of some 3D printing processes to determine an appropriate feed rate to use with a given feature type. According to some embodiments, to determine appropriate feed rates for special feature types of 3D printing, machine learning is employed within a closed loop system context. According to some embodiments, a given feature is printed using multiple induced feed rates along the edge of the feature, with the response of the closed loop Z-axis height correction system being captured. According to some embodiments, the distances to the edge and/or corner of the feature, along with the closed loop response, are used to train a neural network that predicts the open loop feed rate used. According to some embodiments, once the neural network is trained, the appropriate feed rate is then chosen as the one that corresponds to the closed loop system not modifying the open loop response.

Thus, some embodiments automatically determine an appropriate feed rate for special features in 3D printing, without having to print multiple instances of the features and without having to apply visual inspection or an external network.

These and other features and advantages are shown and described herein in reference to the figures.

Figure 1:
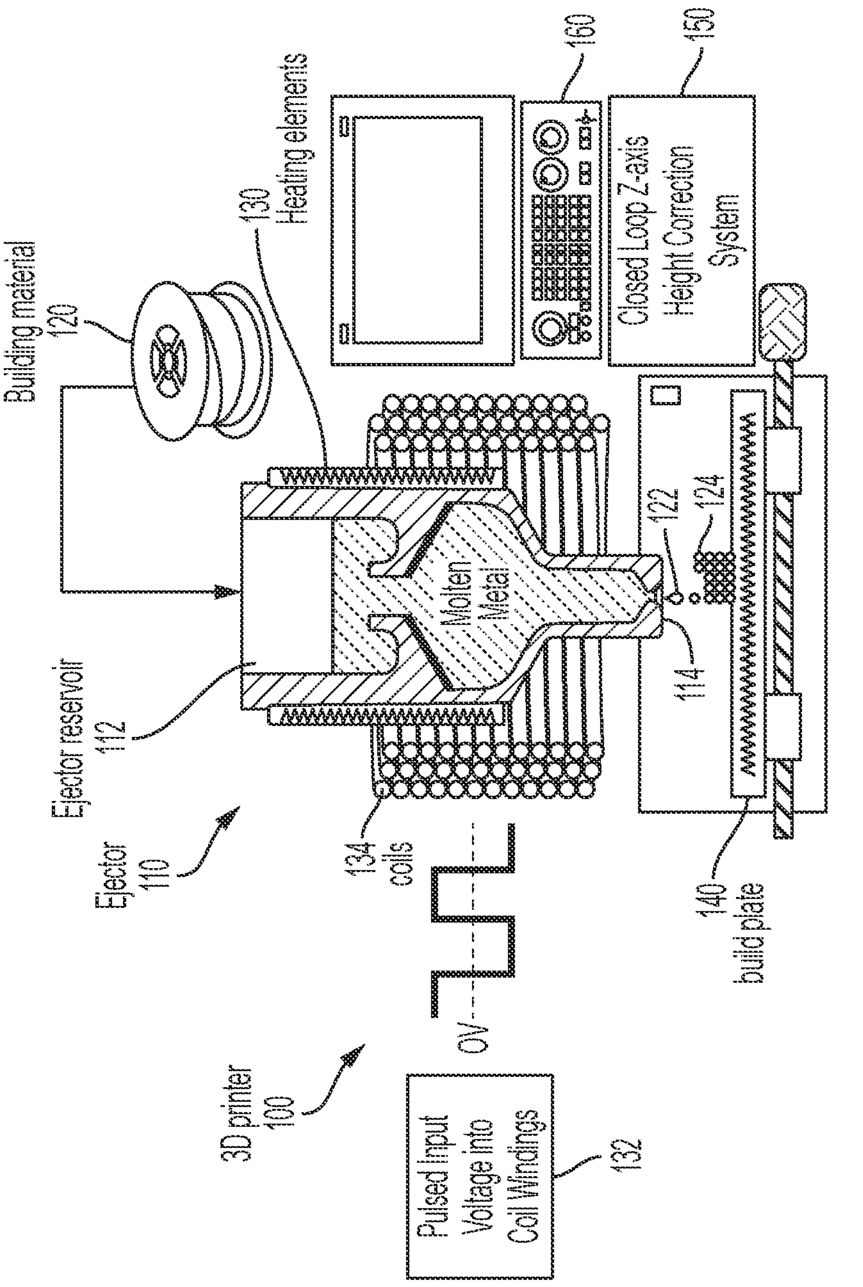
FIG. 1 depicts a schematic cross-sectional side view of a 3D printer, according to various embodiments.

FIG. 1 depicts a schematic cross-sectional side view of a 3D printer 100, according to various embodiments. The 3D printer 100 may be or include a magnetohydrodynamic (MHD) printer, a piezoelectric-driven printer, or the like. The 3D printer 100 may include an ejector (also referred to as a pump) 110. As used herein, the ejector 110 refers to a structure that can be selectively activated to cause a build material 120 to be ejected from a nozzle 114 of the ejector 110.

The ejector 110 may define one or more reservoirs 112. One ejector reservoir 112 is shown in FIG. 1. In another embodiment, the ejector 110 may include two or more reservoirs including at least a first (e.g., upper) reservoir and a second (e.g., lower) reservoir. In this embodiment, the portion of the ejector 110 defining the upper reservoir may be or include a ceramic material, and the portion of the ejector 110 defining the lower reservoir may be or include a graphite material.

The ejector reservoir(s) 112 is/are configured to receive and/or store the build material 120 that is to be ejected from the nozzle 114. The build material 120 may be or include a metal, a polymer, a ceramic, or the like. In one embodiment, the build material 120 may be greater than about 50% metal, greater than 60% metal, greater than 70% metal, greater than 80% metal, greater than 90% metal, or about 100% metal (e.g., by volume or mass). For example, the build material 120 may be or include a spool of aluminum wire (e.g., 6061 aluminum). In another embodiment, the build material 120 may be or include copper or other metals.

The 3D printer 100 may also include one or more heating elements 130. The heating elements 130 may be configured to melt the build material 120 within the ejector reservoir 112, thereby converting the build material 120 from a solid state to a liquid (e.g., molten) state within the ejector reservoir 112.

The 3D printer 100 may also include a power source 132 and one or more metallic coils 134. The metallic coils 134 are wrapped at least partially around the ejector 110 and/or the heating elements 130. The power source 132 may be coupled to the coils 134 and configured to provide power thereto. In one embodiment, the power source 132 may be configured to provide a step function direct current (DC) voltage profile (e.g., voltage pulses or jetting pulses) to the coils 134, which may create an increasing magnetic field. The increasing magnetic field may cause an electromotive force within the ejector 110, that in turn causes an induced electrical current in the liquid build material 120. The magnetic field and the induced electrical current in the liquid build material 120 may create a radially inward force on the liquid build material 120, known as a Lorentz force. The Lorentz force creates a pressure at an inlet of the nozzle 114 of the ejector 110. The pressure causes the liquid build material 120 to be jetted through and/or ejected from the nozzle 114 in the form of one or more drops 122.

The 3D printer 100 may include a build plate (also referred to as a substrate) 140 that is positioned below the nozzle 114. The drops 122 may be ejected from the nozzle 114 and subsequently land on the build plate 140 where they may cool and solidify to form a first (e.g., bottom) layer. Additional drops 122 may be jetted to form layer upon layer that eventually produces a 3D part 124.

The 3D printer 100 may also include one or more substrate control motors that are configured to move the build plate 140 while the drops 122 are being ejected through the nozzle 114, or during pauses between when the drops 122 are being ejected through the nozzle 114, to cause the 3D part to have the desired shape and size. The substrate control motors may be configured to move the substrate in one dimension (e.g., along the X-axis), in two dimensions (e.g., along the X-axis and the Y-axis), or in three dimensions (e.g., along the X-axis, the Y-axis, and the Z-axis). According to some embodiments, the nozzle 114 may be also or instead be configured to move in one, two, or three dimensions. In other words, the build plate 140 may be moved under a stationary nozzle 114, or the nozzle 114 may be moved above a stationary build plate 140. In some embodiments, there may be relative rotation between the nozzle 114 and the build plate 140 around one or two axes, e.g., such that there is four or five axis position control. In some embodiments, both the nozzle 114 and the build plate 140 may move. For example, the build plate 140 may move in X and Y directions, while the nozzle 114 may move up and/or down in the Z direction.

The 3D printer 100 may include a closed loop Z-axis height correction system 150, which monitors the height of the deposition and corrects the feed rate accordingly. According to various embodiments, the closed loop Z-axis height correction system 150 may include a camera or a (e.g., laser) scanner that is configured to capture a feed (e.g., video and/or images) of the nozzle 114, the drops 122, the 3D part 124, or a combination thereof. According to various embodiments, the camera captures images of the part as the drops are deposited, which may be analyzed to determine whether the deposition height at a given layer is within specification. In another example, the camera may be configured to capture the feed of the drops 122 as they are falling. More particularly, the feed may show the drops 122 after they are ejected from the nozzle 122 and before they land on the build plate 140. The size, shape, mass, and/or direction of the drops 122 may be determined based upon the feed.

While the closed loop Z-axis height correction system 150 can correct the feed rate based on the monitored deposition height as a part is being printed, such correction leaves an error in the printed part. Multiple such errors can occur and accumulate, and the resulting part can be out of spec and unusable.

The 3D printer 100 may also include a computing system 160. As described herein, the computing system 160 may perform at least a portion of the methods described herein in reference to FIGS. 6 and 7, for example.

Figure 2:
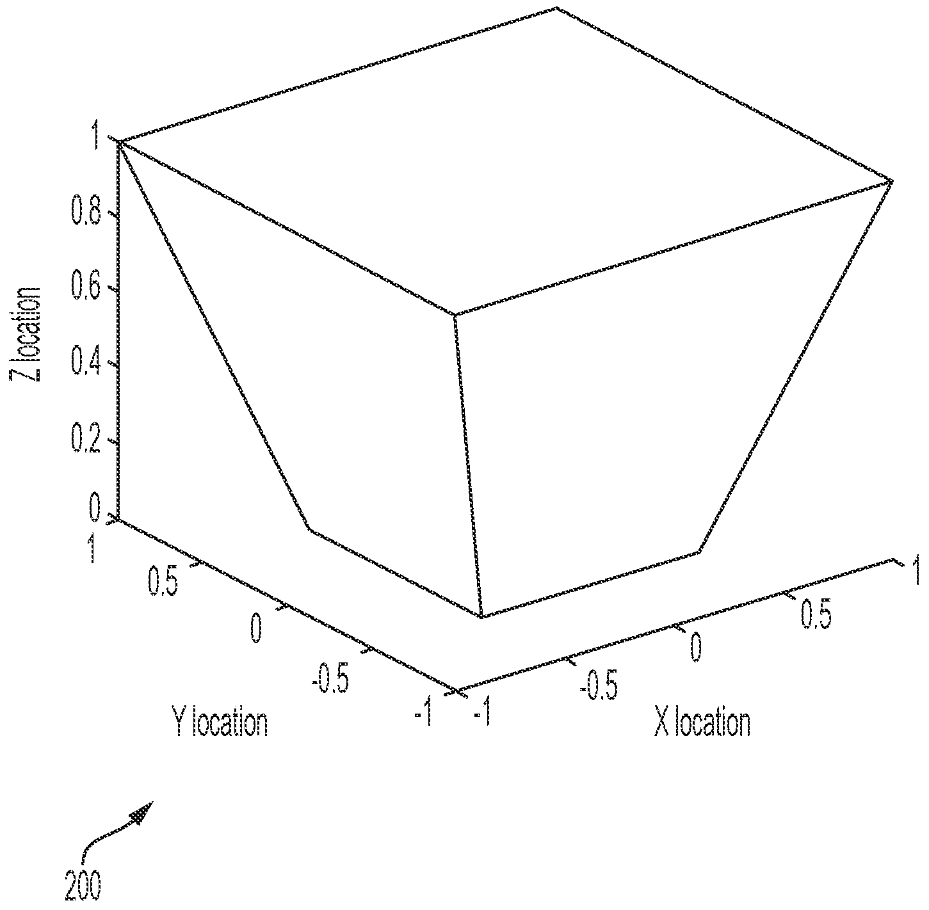
FIG. 2 depicts a part overhang feature according to various embodiments.

FIG. 2 depicts a part overhang feature 200 according to various embodiments. When printed, each subsequent layer of the overhang feature 100 will slightly project beyond the previous layer. Such projections, along with variations in temperature, for example, can generate print errors if a nominal feed rate typically used for an interior deposition is used for the edge of the feature. Further, although a closed loop Z-axis height correction system can correct the feed rate, each correction may nevertheless leave an undesirable artifact. Such artifacts may disadvantageously accrue, and result in an undesirable part.

According to some embodiments, to train a machine learning system to determine appropriate feed rates for features such as overhangs, multiple feed rates are tested in each feature in a single print instance. For example, the feed rate may be varied along the edge of the feature, such as along the edge of a layer of the overhang feature 200, as a function of position (e.g., rather than the feed rate being set according to a nominal feed rate and adjusted in real time during printing by the closed loop Z-height correction system). As each square layer of the overhang feature 200 is printed, a feed rate variation at every point can be induced as shown and described in reference to FIG. 3, for example. Both the feed rate variations and the responses of the closed loop system can be recorded and used to train a machine learning system, according to various embodiments as described in detail herein.

Figure 3:
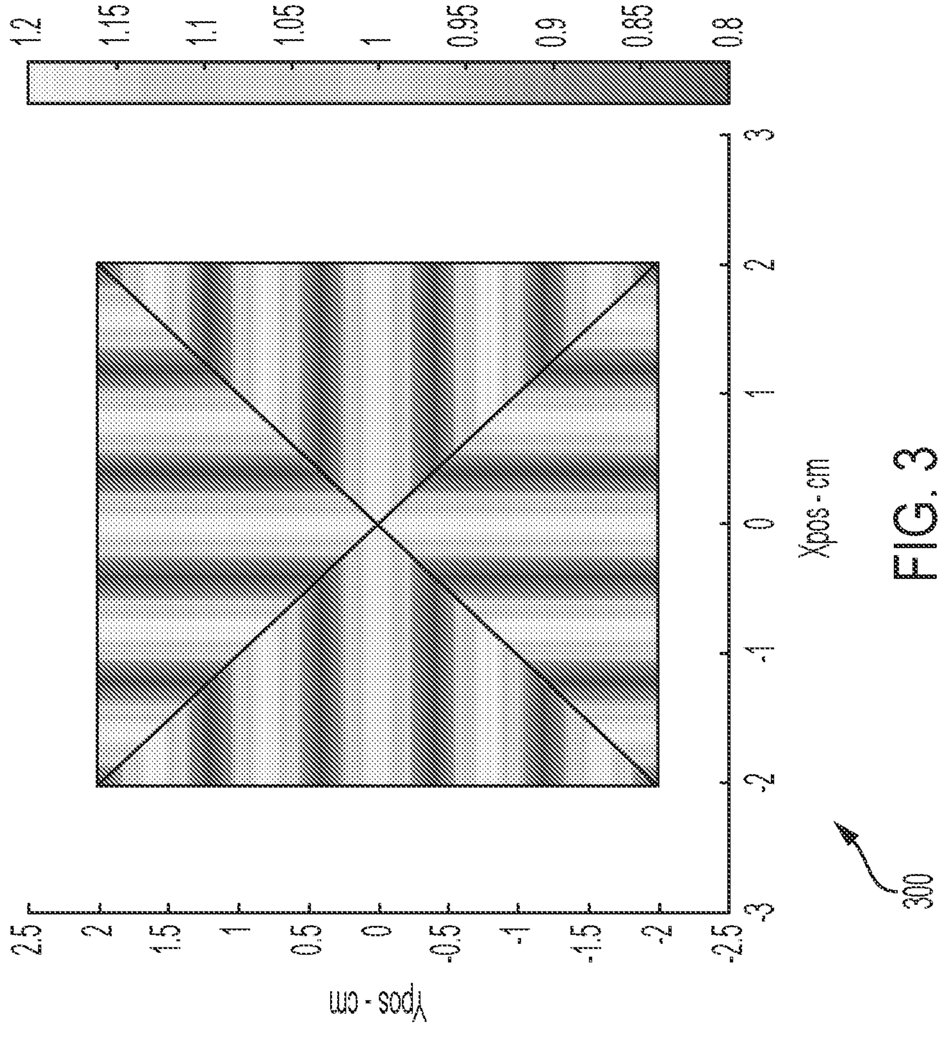
FIG. 3 depicts an induced feed rate variation map according to various embodiments.

FIG. 3 depicts an induced feed rate variation map 300 according to various embodiments. For example, if the value at a given (X, Y) location of the induced feed rate variation map 300 is 1.1, then the induced feed rate for that location is 1.1 times the nominal feed rate, and more material is used in the local area. If the induced feed rate at another location is 0.9, then the induced feed rate for that location is 0.9 times the nominal feed rate, and less material is deposited compared to the average around that location. The induced feed rate thus varies by location according to the induced feed rate variation map 300, and along every edge there will be multiple feed rates used for the simple overhang due to the induced perturbation/variation of the gain map. The multiple feed rates may be induced according to a periodic pattern, for example. As shown in the induced feed rate variation map 300, the induced feed rate variations along an edge are sinusoidal, e.g., varying from 0.8 to 1.2.

The induced feed rate variation map 300 is used to print a test part, such as the overhang feature 100, and the values of the induced rate variation map 300 as well as the responses of the closed loop Z-axis height correction system are recorded and used to train a machine learning system. In more detail, as the test part is printed using the varying feed rate, the value of the closed loop gain is recorded. In general, the closed loop gain is output by the closed loop Z-axis height correction system for adjusting the feed rate. Thus, the closed loop gain value may be used as a multiplier to adjust the feed rate during the printing process. In areas where the induced feed rate is low, the closed loop response should compensate by having a large gain (e.g., greater than 1.0, in order to command more material). Similarly, in areas where the induced feed rate is high, the closed loop response should compensate by choosing a small gain (e.g., less than 1.0, in order to command less material). If the induced feed rate is correct, then the closed loop response would not need to modify the feed rate, and the feed rate gain would be 1.0. According to some embodiments, a machine learning system is trained to output a feed rate that results in such a feed rate gain.

Figure 4:
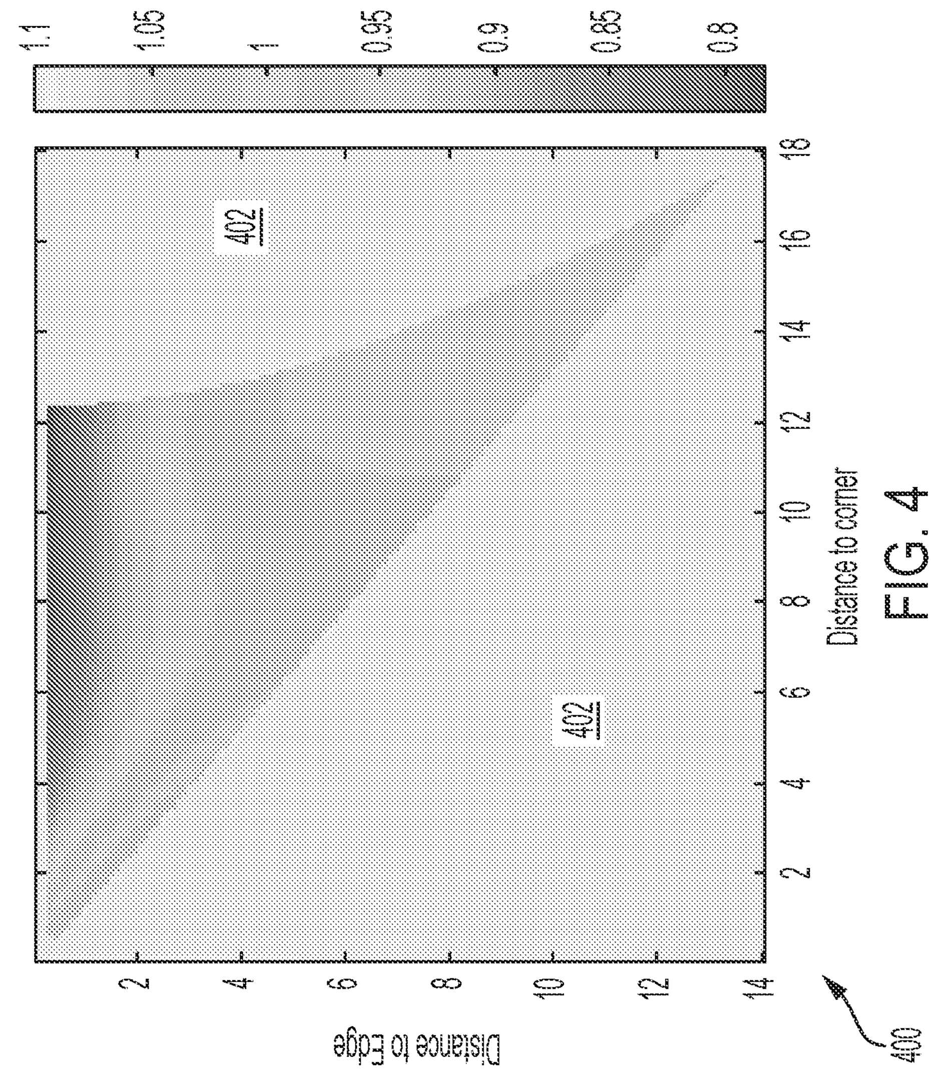
FIG. 4 is a chart depicting closed loop gain as a function of both edge and corner distance for a 50° overhang according to various embodiments.

FIG. 4 is a chart 400 depicting closed loop gain as a function of both edge and corner distance for a 50° overhang according to various embodiments. More particularly, the chart 400 depicts closed loop gain values output by a closed loop Z-axis height correction system as a function of both distance to an edge and distance to a corner for an overhang of 50°. The closed loop gain values may be used as feed rate multiplier values, for example. The units of the chart 400 are millimeters. As the chart 400 shows, the feed rate amount is relatively consistent at a given distance from the edge, as long as the location is not close to a corner. The graph below is only measured inside the boundary 402. The lower left triangle shaped boundary 402 of the chart 400 has no data because the distance to the edge is never larger than the distance to the corner for a 90° corner. The right side crescent shaped boundary 402 of the chart 400 has no data because the printed part was only 12 mm wide.

Some embodiments train a machine learning system to determine appropriate feed rates for printing overhangs with any of a variety of overhang angles. According to some embodiments, a machine learning system is trained using induced feed rate and closed loop gain as training data as shown and described in reference to FIG. 4, together with overhang angle data, as shown and described presently in reference to FIGS. 5A and 5B.

Figure 5A:
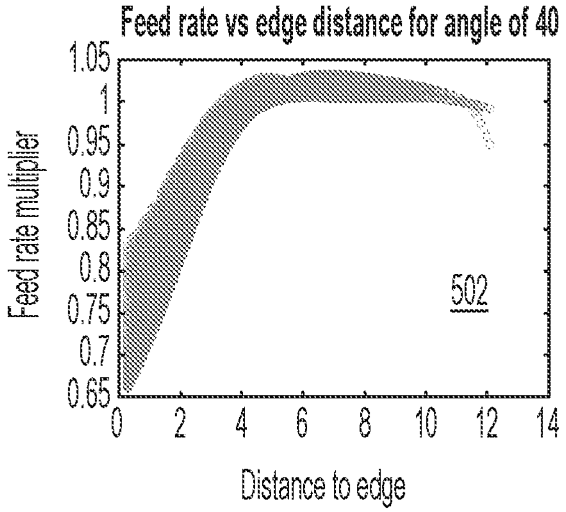
FIGS. 5A and 5B depicts charts showing closed loop gain as a function of edge distance for three different overhang angles.
Figure 5A:
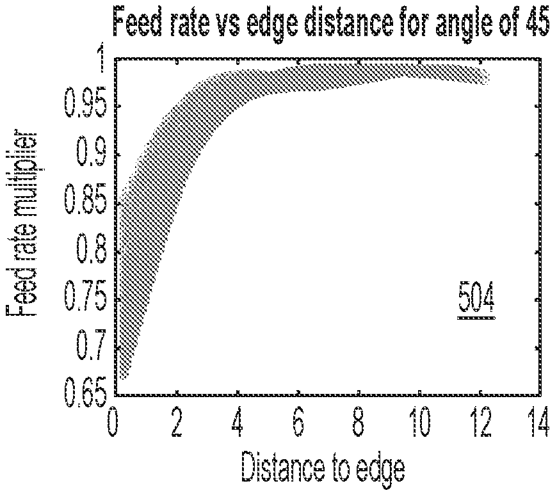
Figure 5B:
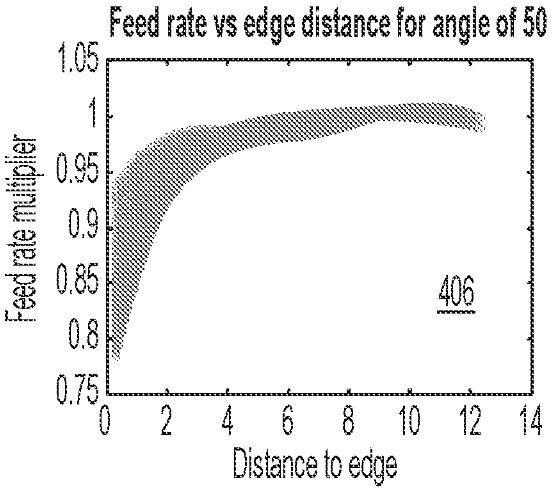

FIGS. 5A and 5B depict charts 502, 504, 506 showing closed loop gain as a function of edge distance for three different overhang angles. In particular, charts 502, 504, 506 show closed loop gain feed rate multipliers generated by a closed loop Z-axis height correction system as a function of just distance to the edge (but at least 2 mm away from a corner) for three different overhang angles. Chart 502 is for an overhang angle of 40°, chart 504 is for an overhang angle of 45°, and chart 506 is for an overhang angle of 50°. The range of measurements represented in the charts 502, 504, 506 are due to local variation of drop size, temperature, and distance to edge, along with other noises and fitting errors, but in an embodiment, a machine learning system may be trained using such data to predict a representative curve for each overhang angle, rather than a scatter graph as shown. Such curves may be considered as two-dimensional slices or projections of a three-dimensional surface such as is represented by FIGS. 5A and 5B. For example, after training according to the data depicted in chart 502, for an overhang angle of 40°, a trained machine learning system may multiply a nominal feed rate for an edge by about 75%, the average of the training data at a distance to the edge of zero.

Once trained with training data for a variety of overhang angles, a trained machine learning system may predict feed rate multipliers for overhang features with angles not present in the training data. For example, if trained using the data of charts 502, 504, and 506, which correspond to angles 40°, 45°, and 50°, respectively, a trained machine learning system may predict closed loop Z-axis height correction gain values for overhang features with angles of, by way of non-limiting example, 42°, 46.5°, 48°, etc.

Figure 6:
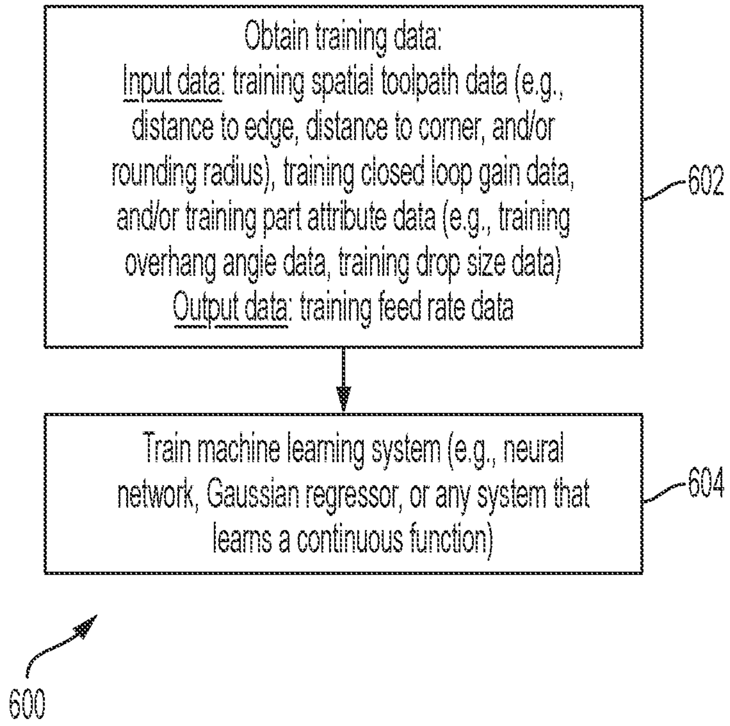
FIG. 6 is a flowchart for a method of training a machine learning system for providing a feed rate for three-dimensional printing a part.

According to various embodiments, a machine learning system is trained using training data so as to be able to output feed rates for various features according to spatial toolpath data regarding the features. FIG. 6 illustrates a method of training a machine learning system according to various embodiments.

FIG. 6 is a flowchart for a method 600 of training a machine learning system for providing a feed rate for three-dimensional printing a part. According to some embodiments, and by way of non-limiting example, the machine learning system may include a computer-implemented neural network. Other embodiments may utilize, by way of non-limiting example, a Gaussian regressor, or any other network or machine learning system that can learn a continuous function. For a neural network embodiments, the neural network may include an input layer, two hidden nodes, and a linear output layer. The neural network may be configured to accept input data, such as spatial toolpath data and closed loop gain data, and provide output data, such as feed rate data. In general, the neural network may be trained with training data that includes training input data (e.g., training spatial toolpath data, training closed loop gain data) and training output data (e.g., training feed rate data). Once trained, the neural network may accept an input that includes spatial toolpath data and a closed loop gain value of one, and output a corresponding feed rate, such that if a feature with the spatial toolpath data is printed with the output feed rate, a closed loop Z-axis height correction system would output a gain of one, and the feed rate would not be altered to adjust the Z-axis height.

At 602, method 600 obtains training data. The training data may be obtained directly using techniques as shown and described herein in reference to FIGS. 3, 4, and/or 5, by way of non-limiting examples, and/or indirectly by retrieval from electronic storage, according to various embodiments.

The training data may include training spatial toolpath data, such as any, or any combination, of: a distance from an edge of the part, a distance to a corner of the part, and/or a rounding radius of a corner. The training data may include training closed loop gain data. The training data may include training feed rate data. Note that for each printed layer (e.g., as shown and described in reference to FIGS. 3, 4, and 5) there may be hundreds of points (e.g., sets of corresponding toolpath spatial data, closed loop gain data, and feed rate data) generated for the training data, as the closed loop correction is calculated on a 100 μm grid according to some closed loop Z-axis height correction systems.

For some embodiments, training feed rate data, training closed loop gain data, and training spatial toolpath data may be sufficient. For other embodiments, any, or a combination, of the preceding may be included, along with data for one or more additional specific feature types. For example, for an overhang feature, training overhang angle data, such as shown and described in reference to FIG. 4, may be included. That is, overhangs of various angles may be printed and the data obtained used to train the class of overhangs by using the additional input of overhang angle in the training. As long as the feed rate response to angle is relatively smooth/continuous, the trained network may predict angles not directly used in the training; this is a great advantage compared to the direct print-and-evaluate prior art technique.

According to some embodiments, any, or a combination, of training feed rate data, training closed loop gain data, training spatial toolpath data, and/or training overhang angle data may be included, along with training drop size data (e.g., for drop on demand three-dimensional printing). In general, as an additional enhancement, measured drop size can be included in the training data. This allows the data training to be more accurate even if the drop size varies, which it often does between runs. (As an alternative to using the drop size to train the neural network, the gain map, such as is shown and described herein in reference to FIG. 2, can be modified by scaling it by the ratio of the actual drop size to the nominal drop size; this converts the gain map from a drop count per unit length to a drop mass per unit length variable drop size, a single multiplier on the two-dimensional function.) Using the drop size as additional training data (or the alternate updating of the gain map) has improved the correlation of the actual feed rate with the predicted output of the neural network in a reduction to practice.

When extending the number of inputs (e.g., using a parameter for a class of feature types, such as overhang angle and/or drop size) it may be beneficial to also increase the number of hidden nodes in the neural network to be able to handle variations that happen with the additional parameter(s). If the number of points used in training is much greater than the number of connections of the neural network topology, overfitting should not occur. For the case of training overhang angle data, the number of hidden nodes may be three, by way of non-limiting example.

At 604, method 600 trains the machine learning system using the training data obtained at 602. The training may include an iterative process for training a neural network, for example.

Once trained, the machine learning system may accept input data, such as spatial toolpath data corresponding to a part or portion thereof, as well as a gain value, such as one, and output a corresponding feed rate. When the part (or portion thereof) is printed with the output feed rate, the Z-axis height need not be adjusted, because of the training data that it was trained with. For example, in the interior of a layer, e.g., far from an edge, the closed loop gain value is generally the inverse of the induced feed rate variation, as the nominal unperturbed feed rate chosen for the interior is generally accurate, so the gain should just "undo" the induced variation.

According to a reduction to practice, training results using over 100,000 points show that the correlation between the actual instantaneous feed rate of the three-dimensional printer and the estimated value provided by the trained machine learning system was about 80% for overhangs. That is, the neural network of the reduction to practice could predict about 80% of the variation in the feed rate. If not training across parts (e.g., for a single overhang angle), the correlation may be even better. This allows an efficient method of determining the feed rate needed for unique features.

Figure 7:
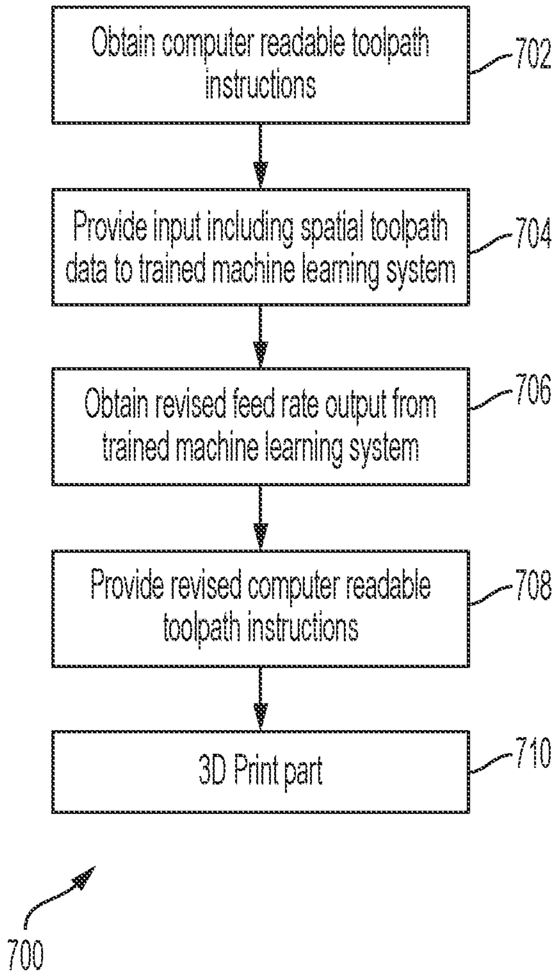
FIG. 7 is a flowchart for a method of providing a feed rate for three-dimensional printing a part.

FIG. 7 is a flowchart for a method 700 of providing a feed rate for three-dimensional printing a part. The method 700 may be implemented subsequent to the implementation of the method 600 as shown and described in reference to FIG. 6, and may utilize the computer-implemented neural network trained according to the method 600.

At 702, the method 700 includes obtaining computer readable toolpath instructions for the part. The computer readable instructions may be included in a GCode file, by way of non-limiting example. The toolpath instructions may direct a tool to follow a toolpath and extrude or otherwise deposit material along some or all of the toolpath to produce one or more layers to produce the part. The toolpath instructions may specify a nominal feed rate for a toolpath segment (e.g., a local portion of a longer toolpath) and spatial toolpath data of the toolpath segment.

At 704, the method 700 includes providing an input that includes the spatial toolpath data to a trained machine learning system. The trained machine learning system may be generated as shown and described herein in reference to FIG. 6, for example. The trained machine learning system may be trained using training data, such as training spatial toolpath data, training closed loop gain data, and training feed rate data, e.g., as described herein in reference to FIGS. 5A and 5B.

At 706, the method 700 includes obtaining a revised feed rate for the toolpath segment output from the trained machine learning system in response to the input of 704. The revised feed rate may be the same as or different from the nominal feed rate for the toolpath segment.

At 708, the method 700 includes providing revised computer readable toolpath instructions. The revised computer readable toolpath instructions may include the revised feed rate for the toolpath segment, e.g., replacing the nominal feed rate for all or part of the toolpath segment. The revised computer readable toolpath instructions may be in the form of GCode, by way of non-limiting example. The instructions may be provided to a three-dimensional printer, for storage in persistent electronic memory, or over a network, for example.

At 710, the method 700 includes printing the part using the revised computer readable toolpath instructions. The part may be printed using any of a variety of three-dimensional printers and in any of a variety of materials.

Many variations and alternative embodiments fall within the scope of this disclosure. For example, some embodiments may train a machine learning system to print layers on top of layers that have been printed with fewer errors using the techniques disclosed herein. For example, an initial layer may be printed using closed loop Z-axis height correction gain values provided by a machine learning system that has been trained to print using training data obtained by printing an initial layer, and a subsequent layer may be printed using closed loop Z-axis height correction gain values provided by a machine learning system that has been trained to print using training data obtained by printing a layer on top of such a first layer. Such embodiments may account for the fact that an initial layer printed using the techniques disclosed herein will be more accurate than an initial layer printed without using the techniques disclosed herein. Accordingly, a subsequent layer may be printed using a trained machine learning system that has been trained to print on top of such a more accurate initial layer. Thus, some embodiments may be further iteratively trained to print on top of previous layers printed using a machine learning system trained according to a previous iteration.

Note that some embodiments may be used together with real time closed loop Z-axis height correction. However, such embodiments are expected to utilize closed loop Z-axis height correction less than if closed loop Z-axis height correction were used without the machine learning embodiments disclosed herein.

Some embodiments may provide a pre-trained machine learning system, where the pre-trained machine learning system has been pre-trained for a first feature or set of features using training data obtained from a particular three-dimensional printer or class of three-dimensional printers. Some embodiments may be additionally trained for an additional feature or set of features using training data obtained from the same three-dimensional printer or class of three-dimensional printers, or from a different three-dimensional printer or class of three-dimensional printers.

Certain examples can be performed using a computer program or set of programs. The computer programs can exist in a variety of forms both active and inactive. For example, the computer programs can exist as software program(s) comprised of program instructions in source code, object code, executable code or other formats; firmware program(s), or hardware description language (HDL) files. Any of the above can be embodied on a transitory or non-transitory computer readable medium, which includes storage devices and signals, in compressed or uncompressed form. Exemplary computer readable storage devices include conventional computer system RAM (random access memory), ROM (read-only memory), EPROM (erasable, programmable ROM), EEPROM (electrically erasable, programmable ROM), and magnetic or optical disks or tapes.

Aspects of the present disclosure are described herein with reference to flowchart illustrations (e.g., FIGS. 6 and 7) and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented using computer readable program instructions that are executed by a processor.

These computer readable program instructions may be provided to a processor of a general-purpose computer, special purpose computer, or other programmable data processing apparatus, to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

In embodiments, the computer readable program instructions may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the C programming language or similar programming languages. The computer readable program instructions may execute entirely on a user's computer, partly on the user's computer, as a stand-alone software package, partly on the user's computer and partly on a remote computer or entirely on the remote computer or server.

As used herein, the terms "A or B" and "A and/or B" are intended to encompass A, B, or {A and B}. Further, the terms "A, B, or C" and "A, B, and/or C" are intended to encompass single items, pairs of items, or all items, that is, all of: A, B, C, {A and B}, {A and C}, {B and C}, and {A and B and C}. The term "or" as used herein means "and/or."

As used herein, language such as "at least one of X, Y, and Z," "at least one of X, Y, or Z," "at least one or more of X, Y, and Z," "at least one or more of X, Y, or Z," "at least one or more of X, Y, and/or Z," or "at least one of X, Y, and/or Z," is intended to be inclusive of both a single item (e.g., just X, or just Y, or just Z) and multiple items (e.g., {X and Y}, {X and Z}, {Y and Z}, or {X, Y, and Z}). The phrase "at least one of" and similar phrases are not intended to convey a requirement that each possible item must be present, although each possible item may be present.

The techniques presented and claimed herein are referenced and applied to material objects and concrete examples of a practical nature that demonstrably improve the present technical field and, as such, are not abstract, intangible, or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. § 112(f). However, for any claims containing elements designated in any other manner, it is intended that such elements are not to be interpreted under 35 U.S.C. § 112(f).

While the invention has been described with reference to the exemplary examples thereof, those skilled in the art will be able to make various modifications to the described examples without departing from the true spirit and scope. The terms and descriptions used herein are set forth by way of illustration only and are not meant as limitations. In particular, although the method has been described by examples, the steps of the method can be performed in a different order than illustrated or simultaneously. Those skilled in the art will recognize that these and other variations are possible within the spirit and scope as defined in the following claims and their equivalents.

What is claimed is:

1. A method of providing a feed rate for three-dimensional printing a part, the method comprising:

obtaining computer readable toolpath instructions for the part, wherein the toolpath instructions specify a nominal feed rate for a toolpath segment and spatial toolpath data of the toolpath segment;

providing an input comprising the spatial toolpath data to a trained machine learning system, prior to printing the part, wherein the trained machine learning system has been trained using training data comprising: training spatial toolpath data, training closed loop gain data, and training feed rate data, wherein the training closed loop gain data comprises closed loop gain feed rate multipliers generated by a closed loop Z-axis height correction system;

obtaining a revised feed rate for the toolpath segment different from the nominal feed rate for the toolpath segment, prior to printing the part, wherein the revised feed rate is output from the trained machine learning system; and providing revised computer readable toolpath instructions, wherein the revised machine learning toolpath instructions comprise the revised feed rate.

2. The method of claim 1, further comprising printing the part using the revised computer readable toolpath instructions.

3. The method of claim 1, wherein the input further comprises a predetermined closed loop gain value.

4. The method of claim 1, wherein the training data comprises data that is specific to the part, the method further comprising training the trained machine learning system using the training data.

5. The method of claim 1, wherein the toolpath instructions specify an anisotropic region of the part that comprises the toolpath segment.

6. The method of claim 5, wherein the anisotropic region comprises at least one of: an overhang, an outer perimeter, or a thin feature.

7. The method of claim 1, wherein the spatial toolpath data for the toolpath segment comprises at least one of: a distance from an edge of the part, a distance from a corner of the part, or a rounding radius of the toolpath segment.

8. The method of claim 1, wherein the training data further comprises training overhang angle data.

9. The method of claim 1, wherein the training feed rate data comprises an induced feed rate variation.

10. The method of claim 9, wherein the induced feed rate variation comprises a periodic induced feed rate variation along an edge of a feature.

11. A system for providing a feed rate for three-dimensional printing a part, the system comprising an electronic processor and a persistent memory storing non-transitory computer readable instructions that, when executed by the electronic processor, configure the electronic processor to perform actions comprising:

obtaining computer readable toolpath instructions for the part, wherein the toolpath instructions specify a nominal feed rate for a toolpath segment and spatial toolpath data of the toolpath segment;

providing an input comprising the spatial toolpath data to a trained machine learning system, prior to printing the part, wherein the trained machine learning system has been trained using training data comprising: training spatial toolpath data, training closed loop gain data, and training feed rate data, wherein the training closed loop gain data comprises closed loop gain feed rate multipliers generated by a closed loop Z-axis height correction system;

obtaining a revised feed rate for the toolpath segment different from the nominal feed rate for the toolpath segment, prior to printing the part, wherein the revised feed rate is output from the trained machine learning system; and providing revised computer readable toolpath instructions, wherein the revised machine learning toolpath instructions comprise the revised feed rate.

12. The system of claim 11, wherein the actions further comprise printing the part using the revised computer readable toolpath instructions.

13. The system of claim 11, wherein the input further comprises a predetermined closed loop gain value.

14. The system of claim 11, wherein the training data comprises data that is specific to the part, the actions further comprising training the trained machine learning system using the training data.

15. The system of claim 11, wherein the toolpath instructions specify an anisotropic region of the part that comprises the toolpath segment.

16. The system of claim 15, wherein the anisotropic region comprises at least one of: an overhang, an outer perimeter, or a thin feature.

17. The system of claim 11, wherein the spatial toolpath data for the toolpath segment comprises at least one of: a distance from an edge of the part, a distance from a corner of the part, or a rounding radius of the toolpath segment.

18. The system of claim 11, wherein the training data further comprises training overhang angle data.

19. The system of claim 11, wherein the training feed rate data comprises an induced feed rate variation.

20. The system of claim 19, wherein the induced feed rate variation comprises a periodic induced feed rate variation along an edge of a feature.

* * * * *